Feb. 23, 1960

F. C. AEBERSOLD ET AL 2,925,974

ECCENTRIC SLIP FRICTION VIBRATION DAMPING MOUNT

Filed March 18, 1957

INVENTORS.
Frederick C. Aebersold
Francis G. Sullivan.
BY
Harness and Harris
ATTORNEYS.

United States Patent Office 2,925,974
Patented Feb. 23, 1960

2,925,974

ECCENTRIC SLIP FRICTION VIBRATION DAMPING MOUNT

Frederick C. Aebersold, Farmington, and Francis G. Sullivan, Birmingham, Mich., assignors to Chrysler Corporation, Highland Park, Mich., a corporation of Delaware Application March 18, 1957, Serial No. 646,673

6 Claims. (Cl. 248—9)

This invention relates to resilient, vibration damping, mounting means for suspended, movable objects and particularly to engine mounts for motor vehicles. This invention is an improvement over that shown in the related, commonly-owned, co-pending application of Frederick C. Aebersold, Serial No. 623,238, filed November 19, 1956.

It is a primary object of this invention to provide a vibration damping, noise reducing, engine mount that is simple to manufacture and install, economical to produce, highly resistant to wear, fatigue or deterioration, and superior in operation to existing mounts of this general type due to the fact that means are provided to retain the major portion of the resilient means in its most effective position at all times.

It is still another object of this invention to provide mounting means for this eccentrically positioned, resilient, engine mount that will insure its proper installation and its retention in its most effective position.

Other objects and advantages of this invention will become readily apparent from a reading of the following description and a consideration of the related drawings wherein:

Fig. 1 is a top plan view of the engine supporting end of a motor vehicle chassis frame having engine mounts embodying this invention;

Fig. 2 is an enlarged, fragmentary, front end elevational view, partly in section, of the Fig. 1 structure, the view being taken as indicated by the arrows 2—2 of Fig. 1;

Fig. 3 is a fragmentary sectional elevational view taken along the line 3—3 of Fig. 2 looking in the direction of the arrows;

Fig. 4 is another fragmentary sectional elevational view taken along the line 4—4 of Fig. 2 looking in the direction of the arrows;

Fig. 5 is a fragmentary sectional elevational view of the lockwasher retainer of the engine mount, the view being taken along the line 5—5 of Fig. 4 looking in the direction of the arrows;

Fig. 6 is a fragmentary end elevational view, partly in section, taken along the line 6—6 of Fig. 5 looking in the direction of the arrows; and Fig. 7 is a fragmentary end elevational view, similar to Fig. 6, showing another form of lockwasher retainer.

These novel motor mountings M in general consist of a sleeve or a bored cylinder of rubber-like material 10 that is interposed between the side walls of a pair of encircling, contiguous, cup-shaped, outside and inside metal shells 11 and 12. The outer shell 11 is attached to the associated engine block E and the inner shell 12 is non-rotatably attached to a chassis frame member 14. The outer periphery of the spool or sleeve of rubber-like material 10 is tightly engaged with but is not bonded to the interior surface of the outer shell 11 therefore it is free for limited slidable movement within the confines of the outer shell 11.

The resilient sleeve or bored cylinder 10 has a bore or aperture extending longitudinally therethrough that is adapted to receive the inner shell 12. The inner shell 12 has its side wall portions connected to the walls of the bore through the sleeve 10 so that there will not be relative rotation between the inner shell 12 and the resilient sleeve 10. In Fig. 3 it will be noted that indented grooves 12a in the walls of the inner shell 12 receive rib-like portions of the material of the sleeve 10 to provide interlocking means that resists relative rotation between the resilient sleeve 10 and the inner shell 12. Obviously bonding or any other type of connecting means can be used to mount this sleeve 10 on the outer side walls of the inner shell 12 so that relative rotation therebetween will be prevented.

Bonding of the resilient sleeve 10 to the outer peripheral walls of the inner shell 12 has been found to have a most beneficial effect on a mount of this type because in addition to preventing relative rotation between the sleeve 10 and shell 12, the bond develops shear forces within the resilient sleeve 10 during engine vibrations and these shear forces materially assist in damping engine vibrations. The bonded connection also prevents the tendency of the resilient sleeve to be compressively deformed into a bulged portion at the lower end of the shell 12. The bonded connection between sleeve 10 and inner shell 12 and the slip-friction connection between sleeve 10 and outer shell 11 provide a mount having excellent damping properties.

In the alternative to bonding the resilient sleeve 10 to the inner shell 12, so that shear forces can be developed in the sleeve 10 during relative longitudinal movement between the sleeve 10 and shells 11, 12, mechanical connecting means could be used to anchor the resilient sleeve 10 to the inner shell 12 to provide for development of shear forces in sleeve 10 during relative longitudinal movement between the sleeve 10 and the shells 11, 12. There are so many known types of mechanical connections such as tabs, ribs, pins, and the like, that no specific form is thought to be required to be shown.

From the foregoing description of the resilient front engine mounts M, it is thought to be obvious that engine vibrations can be damped by the friction of the sliding movement of the engine-mounted outer shells 12 longitudinally along the outer peripheral surfaces of the frame-mounted resilient sleeves 10. The resilient sleeves 10 are also effective to damp engine vibrations by reason of shear and compressive forces developed in the resilient sleeves 10 during engine movement. The resilient sleeves 10 further insulate the engine from the body and frame and provide an effective noise insulating means.

When mounts of the disclosed type are used it has been found that low-speed engine movement, which occurs at engine idle speed, is effectively damped due to the combined action of the rubber-like matter 10 acting in shear, in compression, and in friction resulting from the slippage of the rubber-like spool 10 relative to at least one of the metal shells 11, 12. The closed end 16 of each outer shell 11 extends over the upper end peripheral flange 10a of the associated rubber-like spool 10 and coacts therewith in a manner that will be subsequently explained. The closed lower end 18 of the inner shell 12 has a rectangular opening therein that matingly receives the rectangular, unthreaded, upper shank portion 37 of the bolt 38. The bolt 38 is thus connected to the closed bottom end of the inner shell 12 so that relative rotation is prevented between the inner shell 12 and the bolt 38. Non-rotatably mounted on the rectangular shank portion 37 of bolt 38 is a large mount retaining lockwasher 36 that is adapted to be non-rotatably connected to the associated frame member 14. The arrangement of the washer 36 represents a major improvement over the construction shown in related, commonly-owned F. C. Aebersold application Serial No. 623,238, filed November 19, 1956. High-frequency engine noise and vibration, that might develop at high engine speeds, is also effectively isolated by this type of resilient mount wherein the resilient material thereof acts in compression and shear and also provides for sliding between the mount sleeve 10 and shell 11 which produces friction damping. Fore-and-aft movement of the associated engine is restricted since this engine motion places the rubber-like material 10 in compression.

Fig. 1 of the drawings shows a motor supporting portion of a vehicle chassis frame C that includes a pair of spaced side rails 9, 9 that are interconnected by frame cross members 14 and 15. Mounted on the frame cross members 14, 15 between the side rails 9, 9 is an engine E which in the case shown is of the V-type. The front end of the engine E is connected to the front frame cross member 14 by a pair of spaced engine vibration damping mounts M, M. Front motor mounts M, which are subsequently described in detail, involve the invention herein disclosed.

The engine block E has sets of mounting ears 21 attached thereto at each side adjacent the front end of the engine. (See Figs. 2 and 3.) Engine support ears 21 have the supporting flanges 24, 25 on the outer shells 11 of the mounts M connected thereto by the bolts 26, 27. It will be noted that upper bolts 26 are connected to bores in each of the mount supporting flanges 24, 25 whereas a lower bolt 27 is connected to only the rearwardly positioned mount flange 25. The specific connector bolt arrangement may be varied to suit the particular design of the engine and chassis frame that are connected by the mounts M.

The rear end of the engine E has the transmission structure T rigidly fixed thereto. The transmission structure T, as well as the rear end portion of the engine E, are supported on the chassis frame rear cross member 15 by a resilient, sandwich-type, engine mount 30. Rear engine mount 30 (see Fig. 2) is more or less conventional and comprises a plate 31 bolted to the transmission structure T, a plate 32 bolted to the frame cross member 15, and an intermediate rubber-like pad 33 positioned between and bonded to the plates 31, 32.

The front engine mounts M, which involve this invention, are identical so only one will be described in detail. Mount M comprises an outer metal tubular shell 11 that is preferably a cup of cylindrical shape. Shell 11 can initially be a cylindrical metal cup with the closed end 16 of the cup punched to provide a breather opening 34 at the upper end of the shell 11 (see Fig. 4). The radially inwardly extending closed end portion 16 of the outer shell 11 engages and compressively deforms the upper end flange 10a of resilient sleeve 10 when the engine E moves vertically downwardly with respect to the chassis frame C. The lower end edge 19 of the outer shell 11 is flared outwardly as clearly shown in Fig. 4. This flaring of the lower edge of the outer shell 11 prevents the lower edge of the shell 11 from cutting into the rubber-like sleeve 10 when compressive forces applied to rubber-like sleeve 10 cause its deformation. Flaring of the lower edge 19 of outer shell 11 also has some softening effect on the mount M.

Welded or otherwise fastened to the outer side of the outer shell 11 is the support bracket 136 that carries the spaced apart support flanges 24, 25. The support flanges 24 and 25 are pierced by one or more apertures that are adapted to receive the mounting bolts 26 and/or 27 for connecting the outer shell 11 to the engine block E.

The rubber-like resilient sleeve 10 that is mounted within the outer shell 11 is of such size that it fits snugly within the outer shell 11 yet is capable of limited, longitudinally directed, sliding movement along the inner cylindrical surfaces of the outer shell 11. Resilient sleeve 10 is of sufficient thickness to provide a compressible mass that will dissipate engine vibration and noise in both compression and shear as well as by slipping friction of the sleeve 10 within the shell 11. The bore through sleeve 10 is offset by the amount X (Fig. 3) from the longitudinal axis of the sleeve 10 and the longitudinal axis of the outer shell 11 for a reason that will be subsequently explained.

The upper end of the resilient sleeve 10 has a recessed central portion that provides an upstanding peripheral flange 10a at the top of the sleeve. Flange 10a can be readily deformed during downward movement of the end portion 16 of the outer shell 11. This compression of the flange 10a combine with friction sliding of outer shell 11 along the outer peripheral side surfaces of the resilient sleeve 10 to provide damping action of an improved type.

Mounted within the axial bore through the resilient sleeve 10 is an inner metal shell or plunger member 12. Inner shell 12 is essentially a thin-walled cup that has the bolt-like connector 38 fixed to and piercing its lower closed end 18. Mounted on the downwardly projecting, rectangular, unthreaded, stud portion 37 of bolt connector 38 is the retainer washer 36. Washer 36 is of such a diameter that it extends beyond the periphery of the inner shell 12 and overlaps a portion of the bottom of the resilient sleeve 10 to prevent disengagement of the sleeve 10 from the shell 12 during times when the outer shell 11 applies a downwardly directed force to sleeve 10. Washer 36 will permit a deformation of the sleeve 10 adjacent the bottom end thereof when the sleeve 10 is placed under compression. The washer 36 will engage the lower end of the resilient sleeve 10 and develop shear in the sleeve 10 during relative longitudinal movement between the sleeve 10 and shells 11, 12. It will be noted that the lower end 10b of the resilient sleeve 10 is chamfered so that as the sleeve 10 is loaded axially in compression there is a somewhat gradual build-up in resistance to compression of sleeve 10.

The retainer washer 36 has a very important function in an eccentric type of slip-friction engine mount such as that disclosed which function may not be readily apparent. In addition to connecting the resilient sleeve 10 to the inner shell 12, the retainer washer 36 is designed to anchor the inner shell 12 against rotation so that during installation of the engine mounts there will be no chance of rotation of the eccentric resilient sleeves 10 from their optimum, intended positions, to some other position where a less amount of resilient material is available for effectively damping engine vibrations. As previously mentioned, the washer 36 has a rectangular opening to receive the rectangular portion 37 of the bolt 38 so that the bolt 38 and inner shell 12 are connected together to prevent relative rotation therebetween. In addition, the outer periphery of the washer 36 has a plurality of axially offset teeth 39 formed therein and arranged in such a manner that there will be outwardly or downwardly projecting tooth edge portions that will bite into the adjacent supporting surface, as indicated at 40 in Fig. 6, when the nut 42 is tightened up on the threaded portion of bolt shank 37. While the preferred form of tooth 39 is shown in the drawings, still, it has been found that the entire undersurface of the washer 36 can be knurled to provide means to prevent rotation of the washer as the nut 42 is being threaded on the bolt 38. Different types and members of teeth from those shown in Fig. 6 can also be used along the periphery of the washers 36. See also lockwasher form shown in Fig. 7.

The advantage of retaining the resilient sleeves in their optimum positions, as shown in Fig. 2, is to have the majority of the resilient material on the top side of the mount M to give the most effective cushion and support for the dead weight of the engine E. Obviously if the inner shell 12 should be turned during threading of the nut 42 on the bolt shank 37 then the minimum quantity of resilient material of the sleeves 10 might be positioned on the top side of the mounts M. Also, due to turning of the inner shells 12 during installation of the mounts M it is possible to misalign the engine E with respect to the frame C due to variation in the eccentricity of the several mount sleeves 10.

To facilitate initial positioning and alignment of the mount sleeves 10 in the shells 11, 12, the top surfaces of the resilient sleeves 10 have a rib 10c formed thereon which can be arranged to extend transversely of or normal to the longitudinal axis of the engine E and adjacent the engine so as to insure proper positioning of the eccentric sleeve 10 with respect to the shells 11, 12.

The chassis frame front cross member 14 is provided with a mounting bracket 41 at each side for receiving each of the front engine mounts M. Bracket 41 has a bore therein to receive the shank 37 of bolt connector 38. A nut 42 fixedly connects each of the bolts 38 to the associated chassis frame bracket 41.

The resilient sleeve mounts M hereinbefore described permit some limited, longitudinally directed, slipping of the rubber-like sleeves 10 relative to the outer metal shells 11 when certain types of forces are applied to the mounts. Accordingly, friction damping develops during this slipping movement that acts in series with the resilient sleeve 10 to assist in damping engine vibration and noise. The eccentric arrangement of the resilient sleeves 10 is such as to position the major portion of the mass of the resilient sleeves 10 where the mass will be most effective to damp vibrations and noise. The retainers 36 insure that the preferred eccentricity of the resilient sleeves 10 will be maintained during mount installation and thereafter. The mounts M thus permit the most efficient use of the rubber-like material 10 and they add friction damping to the shear and compression action of the resilient material of the mounts. It is also thought to be obvious that when forces are applied to the mounts M that act in a direction extending axially of the rubber-like sleeve 10, that then the resilient material 10 of the mount can be deformed to a limited degree so that it can provide the most efficient vibration and noise damping action.

From an inspection of Fig. 2 of the drawings it will be noted that the front engine mounts M extend in a vertical plane at an angle P to the horizontal and converge downwardly towards the plane Q—Q that includes the engine roll axis. Because of this mount angularity it is the upper or top half portions 10d (see Fig. 2) of the resilient sleeves 10 that carry the majority of the radially acting compressive loads of the engine E. The lower or under half portions 10e of the resilient sleeves 10 are unloaded by radially acting static engine loads and the radially acting dynamic loads acting on portions 10e are of lower magnitudes that can be effectively controlled by the reduced cross-sectional lower mount portions 10e. It is thought to be obvious that with the eccentric position of the resilient sleeves 10 relative to the shell 11, 12, that a softer mount is produced for damping purposes than a symmetrical or concentric type of similar mount even though the same amount of resilient material is used in each of these two types of mounts. With the eccentric type of slip friction engine mount herein disclosed the major portion of the resilient material of the sleeves 10 is positioned on the upper side of the inner plunger shell 12 and thus there is a maximum of resilient material positioned for effective vibration damping. The non-rotatable connection between the inner shell mounting bolts 38 and the retainer washers 36 and the locking means 39 on the retainer washers 36 cooperate to give an improved engine mount.

Fig. 7 is a fragmentary view of a second form of lockwasher retainer 36'. This washer retainer 36' is similar in shape to the retainer 36 shown in Figs. 5 and 6 but it differs from retainer 36 in that the teeth 39' are of a different construction than teeth 39. Teeth 39' are formed by a compression of the rim portion of the washer 36' whereas the teeth 39 of washer 36 are formed by a shearing or cutting process. In either case the washer teeth are hardened after their formation so that they will bite into the support 41 as indicated at 40 or 40'.

We claim:

1. A vibration damping mount comprising an outer cylindrical shell member having portions of the top thereof shaped to provide inwardly extending, radially directed, flange-like obstructions, a cylinder of resilient, rubber-like, material arranged within said outer shell member with the outer cylindrical surface thereof contiguous to and slidable along the inner peripheral wall of said outer shell, the upper end of said resilient cylinder having portions engageable with the obstructions at the top of the outer shell preventing free movement of the resilient cylinder longitudinally of the outer shell member through the top thereof, said resilient cylinder having a bore extending longitudinally thereof that is eccentrically positioned with respect to the longitudinal axis of the cylinder, an inner plunger member arranged within the bore in said resilient cylinder having the peripheral outside surfaces thereof connected to said cylinder and preventing relative rotation therebetween, retainer means non-rotatably connected to said inner plunger member and engageable with the resilient cylinder preventing movement of the resilient cylinder lengthwise of the inner plunger member in one direction so as to develop shear forces in the resilient cylinder when relative longitudinal movement between the cylinder and inner plunger occurs, said retainer means having means thereon adapted to bitingly engage an adjacent mount supporting surface to prevent relative rotation therebetween.

2. A vibration damping mount comprising an inverted cup-shaped outer shell member, a cylinder of resilient, rubber-like, material arranged within said outer shell member with the outer cylindrical surface thereof contiguous to and slidable along the inner peripheral wall of said outer shell, the upper end of said resilient cylinder having deformable portions of reduced thickness engageable with the closed end of the outer shell preventing free movement of the resilient cylinder longitudinally of the outer shell member towards the top thereof, said resilient cylinder having a bore therein that is eccentrically positioned with respect to the longitudinal axis of the cylinder, a cup-shaped inner shell member arranged within the bore in said resilient cylinder having the peripheral outside surfaces thereof fixedly connected to the bore in the resilient cylinder, said inner shell member having retainer means non-rotatably connected to the closed end thereof and having portions projecting beyond the sides thereof engageable with the lower end of the resilient cylinder to limit movement of the resilient cylinder lengthwise of the inner shell towards the bottom thereof, and means carried by the retainer means adapted to bitingly engage an adjacent mount supporting surface preventing relative rotation between the retainer means and said supporting surface when the retainer is mounted thereon.

3. A vibration damping mount as set forth in claim 2 wherein the retainer means comprises a washer with a plurality of teeth formed thereon and projecting from its undersurface to provide surface gripping means.

4. A vibration damping mount as set forth in claim 2 wherein the retainer means comprises a washer having portions of its undersurface knurled to provide surface gripping means.

5. A vibration damping mount as set forth in claim 2 wherein the resilient cylinder is bonded to the inner shell member.

6. A vibration damping mount as set forth in claim 2 wherein the inner shell peripheral surface and the bore surface of the resilient cylinder have interengaging ribs and grooves to prevent relative rotation between these adjacent connected members.

References Cited in the file of this patent

UNITED STATES PATENTS

| 1,982,076 | Spahn | Nov. 27, 1934 |
| 2,332,264 | Saurer | Oct. 19, 1943 |
| 2,724,770 | Onksen | Nov. 22, 1955 |

FOREIGN PATENTS

| 14,285 of 1906 | Great Britain | July 11, 1905 |
| 486,333 | Great Britain | June 2, 1938 |
| 679,404 | Great Britain | Sept. 17, 1952 |